(12) United States Patent
Veitsman et al.

(10) Patent No.: US 8,961,068 B2
(45) Date of Patent: Feb. 24, 2015

(54) DEVICE, SYSTEM, AND METHOD OF IRRIGATION

(71) Applicants: Alexander Veitsman, Gan Yavne (IL); Yuri Danilov, Rehovot (IL)

(72) Inventors: Alexander Veitsman, Gan Yavne (IL); Yuri Danilov, Rehovot (IL)

(73) Assignee: Tevatronic Ltd., Gan Yavne, IL (US)

( * ) Notice: Subject to any disclaimer, the term of this patent is extended or adjusted under 35 U.S.C. 154(b) by 26 days.

(21) Appl. No.: 13/778,194

(22) Filed: Feb. 27, 2013

(65) Prior Publication Data

US 2013/0223934 A1    Aug. 29, 2013

(30) Foreign Application Priority Data

Feb. 29, 2012  (IL) .......................... 218385

(51) Int. Cl.
*A01G 25/00* (2006.01)
*A01G 25/16* (2006.01)

(52) U.S. Cl.
CPC .................................. *A01G 25/167* (2013.01)
USPC .......................................................... 405/37

(58) Field of Classification Search
USPC .............................. 405/36, 37, 39; 47/79, 48.5
See application file for complete search history.

(56) References Cited

U.S. PATENT DOCUMENTS

| | | | | |
|---|---|---|---|---|
| 3,407,608 A | * | 10/1968 | Whitehead | 405/37 |
| 3,874,590 A | * | 4/1975 | Gibson | 405/37 |
| RE31,023 E | * | 9/1982 | Hall, III | 405/37 |
| 4,930,934 A | * | 6/1990 | Adkins | 405/37 |
| 4,934,096 A | * | 6/1990 | Bentvelsen | 47/79 |
| 5,350,251 A | * | 9/1994 | Daniel | 405/37 |
| 5,667,336 A | * | 9/1997 | Zur | 405/37 |
| 5,749,521 A | * | 5/1998 | Lattery | 405/37 |
| 7,358,626 B2 | * | 4/2008 | Gardner et al. | 405/37 |
| 7,404,899 B2 | * | 7/2008 | Rosen et al. | 405/37 |
| 7,413,380 B2 | * | 8/2008 | Corwon et al. | 405/37 |
| 8,219,254 B2 | * | 7/2012 | O'Connor | 405/37 |
| 2007/0220808 A1 | * | 9/2007 | Kaprielian et al. | 47/48.5 |
| 2010/0212409 A1 | * | 8/2010 | Ranjan | 73/73 |

FOREIGN PATENT DOCUMENTS

SU         1509734        9/1989
WO    2005006836 A2    1/2005

OTHER PUBLICATIONS

International Search Report for corresponding PCT application PCT/IB2013/051566 mailed on Aug. 8, 2013.
Machine translation of Abstract of SU 1509734 generated online on Aug. 22, 2013.

* cited by examiner

*Primary Examiner* — Frederick L Lagman
(74) *Attorney, Agent, or Firm* — Eitman, Mehulal & Sadot (57) ABSTRACT

An irrigation system for irrigating a plant having a root comprises: a valve to begin irrigation from a water source at a first time-point; a moisture sensor to sense moisture at a second, subsequent, time-point, said moisture sensor being located underground at an insertion depth between ground surface and a maximum depth of the root; a water drainage speed calculator to calculate a water drainage speed based on the first time-point, the second time-point, and the insertion depth of the moisture sensor; and a target drainage time calculator to calculate a remaining time for irrigation, based on the calculated water drainage speed and further based on a difference between the insertion depth and the maximum depth of the root.

16 Claims, 5 Drawing Sheets

DEVICE, SYSTEM, AND METHOD OF IRRIGATION

PRIOR APPLICATION DATA

The present application claims priority from Israeli patent application 218385, entitled "Smart Irrigation", filed on Feb. 29, 2012, which is hereby incorporated by reference in its entirety.

FIELD OF THE INVENTION

The present invention relates to the field of irrigation.

BACKGROUND

Irrigation systems may be used for providing water to land or soil. For example, irrigation systems may assist in the growing of agricultural crops, as well as maintenance of landscapes. Irrigation may be particularly important in dry areas, during periods of inadequate rainfall, or in a greenhouse with ground plant growing or floor plant growing (e.g., disconnected from the ground).

Some irrigation systems may operate, manually or automatically, based on pre-defined agricultural guidelines, for example, indicating that a certain type of crop is to be irrigated for a particular period of time at a particular water flow rate. However, the pre-defined agricultural guidelines may not be optimal or adequate, and insufficient irrigation or excessive irrigation may adversely affect the growth of agricultural crops. Furthermore, excessive irrigation may waste water, and may increase the irrigation cost paid by a crop owner.

SUMMARY

The present invention may include, for example, devices, systems, and methods of irrigation.

In accordance with the present invention, for example, an irrigation system for irrigating a plant having a root comprises: a valve to begin irrigation from a water source at a first time-point; a moisture sensor to sense moisture at a second, subsequent, time-point, said moisture sensor being located underground at an insertion depth between ground surface and a maximum depth of the root; a water drainage speed calculator to calculate a water drainage speed based on the first time-point, the second time-point, and the insertion depth of the moisture sensor; and a target drainage time calculator to calculate a remaining time for irrigation, based on the calculated water drainage speed and further based on a difference between the insertion depth and the maximum depth of the root.

In accordance with the present invention, for example, the irrigation system further comprises: an irrigation processor to determine that the remaining time for irrigation elapsed, and to send a signal commanding the valve to stop irrigation from said water source.

In accordance with the present invention, for example, the irrigation system further comprises: a wireless transmitter to transmit to a remote server data corresponding to at least one of: the first time-point, the second time-point, the calculated water drainage speed, and the calculated remaining time for irrigation.

In accordance with the present invention, for example, the irrigation system further comprises: a wireless receiver to receive from a remote server data indicating the maximum depth of the root.

In accordance with the present invention, for example, the irrigation system further comprises: a memory unit to store, in proximity to the plant, a parameter indicating the maximum depth of the root.

In accordance with the present invention, for example, the irrigation system further comprises: a remote server comprising a wireless transmitter to enable a user to remotely modify a value of said parameter stored in said memory unit proximal to the plant.

In accordance with the present invention, for example, the insertion depth is approximately 25 to 40 percent of the maximum root depth.

In accordance with the present invention, for example, the insertion depth is approximately 40 to 60 percent of the maximum root depth.

In accordance with the present invention, for example, the insertion depth of the moisture sensor is unchanged as the root of the plant grows.

In accordance with the present invention, for example, a method for irrigating a plant having a root comprises: beginning irrigation from a water source at a first time-point; sensing moisture at a second, subsequent, time-point, by a moisture sensor being located underground at an insertion depth between ground surface and a maximum depth of the root; calculating a water drainage speed based on the first time-point, the second time-point, and the insertion depth of the moisture sensor; and calculating a remaining time for irrigation, based on the calculated water drainage speed and further based on a difference between the insertion depth and the maximum depth of the root.

In accordance with the present invention, for example, the method further comprises: determining that the remaining time for irrigation elapsed; and sending a signal commanding the valve to stop irrigation from said water source.

In accordance with the present invention, for example, the method further comprises: wirelessly transmitting to a remote server data corresponding to at least one of: the first time-point, the second time-point, the calculated water drainage speed, and the calculated remaining time for irrigation.

In accordance with the present invention, for example, the method further comprises: receiving from a remote server data indicating the maximum depth of the root.

In accordance with the present invention, for example, the method further comprises: storing in proximity to the plant, a parameter indicating the maximum depth of the root.

In accordance with the present invention, for example, the method further comprises: remotely modifying a value of said parameter stored in said memory unit proximal to the plant.

In accordance with the present invention, for example, the insertion depth is approximately 25 to 40 percent of the maximum root depth.

In accordance with the present invention, for example, the insertion depth is approximately 40 to 60 percent of the maximum root depth.

In accordance with the present invention, for example, the method further comprises: maintaining the insertion depth of the moisture sensor unchanged as the root of the plant grows.

The present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION OF THE PRESENT INVENTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

In accordance with the present invention, an irrigation system may determine a suitable irrigation depth for a particular crop being irrigated. The irrigation system may automatically adjust the amount of water being provided and/or the period (s) of time in which irrigation is performed, to ensure that water reaches the suitable irrigation depth in its entirety, and that water is not wasted by irrigating the soil located beneath the suitable irrigation depth. This may result in saving in the amount of saving irrigation water needed, may eliminate or reduce damage to crops due to excessive irrigation, may assist in determining the speed of plant growth, and may allow automation of the irrigation process and reduction in manpower involved in irrigation.

Figure 1A:
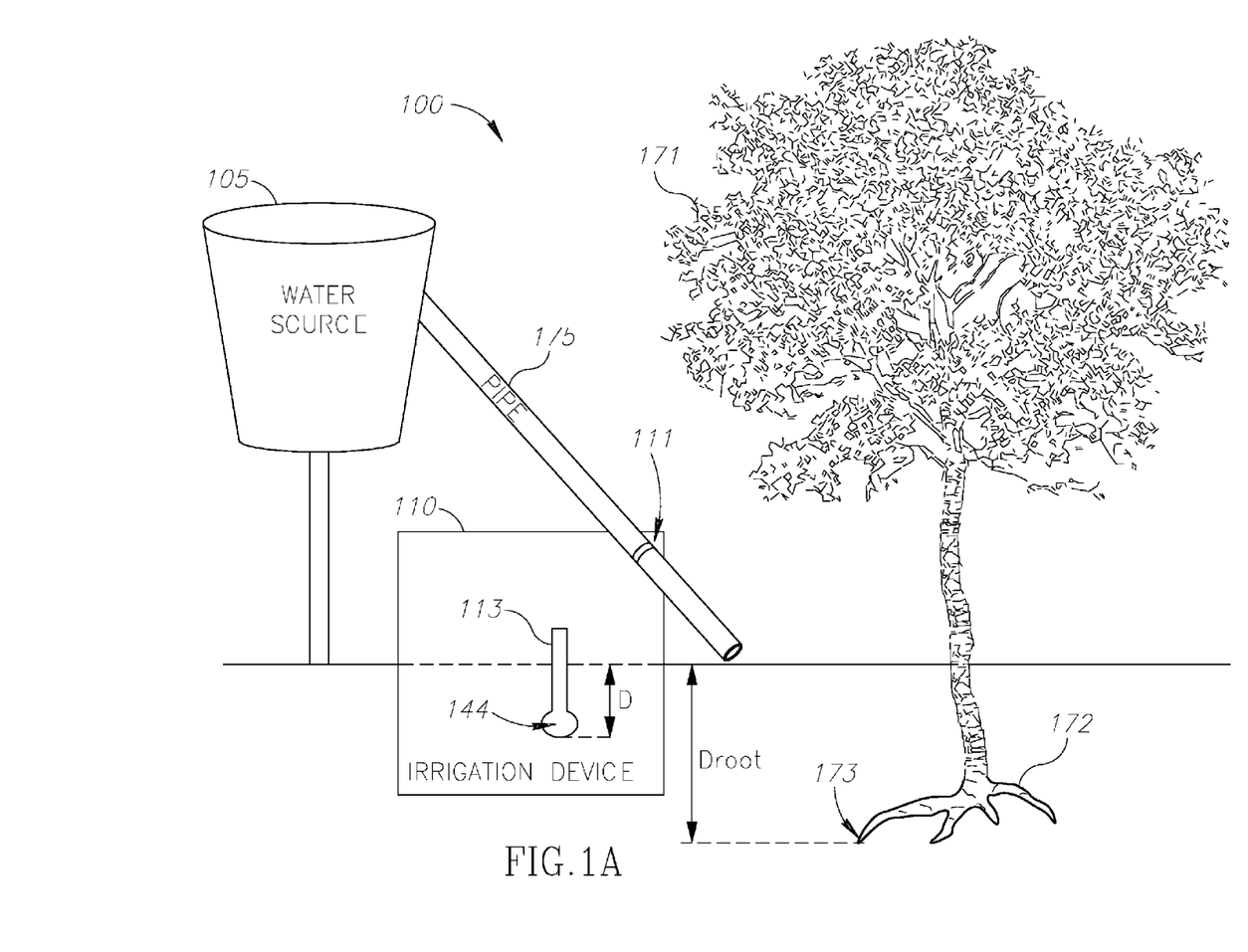
FIG. 1A is another illustration of some components of an irrigation system, in accordance with the present invention.
Figure 1B:
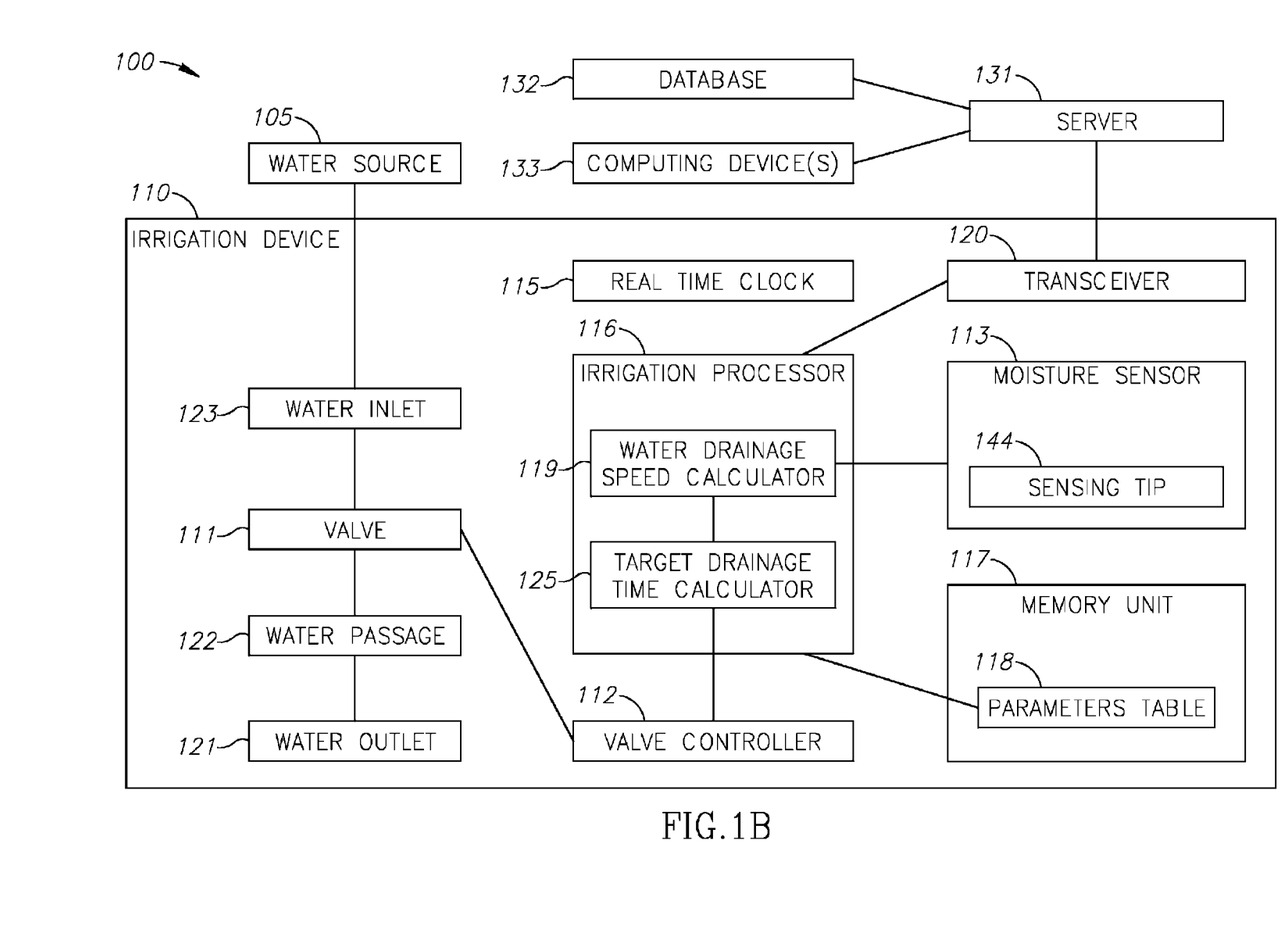
FIG. 1B is a schematic block diagram illustration of the irrigation system, in accordance with the present invention.

Reference is made to FIG. 1B, which is a schematic block diagram illustration of a system 100 in accordance with the present invention; as well as to FIG. 1A, which further demonstrates some of the components of system 100. System 100 may comprise, for example, an irrigation device 110 connected to a water source 105. System 100 may further comprise, optionally, a server 131, a database 132, and one or more computing device(s) 133. System 100 may be used, for example, to efficiently irrigate a crop, plants, a tree, or other suitable plant, which may typically be planted in soil and may typically have one or more roots beneath ground level (or relative to one or more levels, e.g., in a greenhouse having multi-level platforms or shelves or growing containers or planters). For example, the demonstrative illustration of FIG. 1A depicts a tree 171 having a root 172, and further indicates a deepest point 173 of root 172.

Water source 105 may be or may comprise, for example, a water pipe, a water tube, a faucet, a hose, a well, a pool, or other suitable artificial or natural source of water or body of water. Optionally, water source 105 may comprise, or may be operable associated with or connected to, a pipe 175 able to deliver or transfer irrigation water from water source 105 to a target location or target area.

Irrigation device 110 may comprise, for example, a valve 111, a valve controller 112, a moisture sensor 113, a real-time clock (RTC) 115, an irrigation processor 116, a memory unit 117, a parameters table 118 (e.g., stored in memory unit 117), a transceiver 120, a water inlet 123, a water passage 122, a water outlet 121, and/or other suitable hardware components or software modules.

Valve 111 may comprise a valve or shutter able to stop and start the flow of water incoming through water inlet 123 from water source 105 and outgoing through water passage 122 and out of water outlet 121. Valve controller 112 may control the operation of valve 111, for example, to cause valve 111 to be entirely open, to be entirely closed, or to be partially open and partially closed.

Moisture sensor 113 may comprise a unit able to measure or determine soil humidity, soil moisture, soil moisture tension, or matric water potential. Moisture sensor 113 may be implemented as a stand-alone sensor or an independent sensor, or may be implemented as part of another sensor or unit, for example, vacuum sensor or pressure sensor as a part of a soil tensiometer. For example, moisture sensor 113 may comprise a porcelain tensiometer, an electronic tensiometer, a tensiometer probe, or other suitable type of tensiometer. Optionally, moisture sensor 113 may have a particular region or area or tip which may be sensitive to humidity or moisture, for example, a sensitive tip 144.

Moisture sensor 113 may be located beneath ground level (or, beneath a surface level or an upper level in a platform or shelf of container or planter), for example, at a pre-defined depth D. For example, moisture sensor 113 may be entirely under the ground; or alternatively, at least a sensing portion or sensing region of moisture sensor 113 (e.g., particularly sensitive tip 144) may be under the ground, at the pre-defined insertion depth D. The value of insertion depth D may be determined manually by the user or automatically by irrigation processor 116, based on the particular type of crop to be irrigated, and/or based on other irrigation-related parameters (e.g., type of soil; time of year). In some demonstrative embodiments of the invention, for example, the value of insertion depth D may be smaller (e.g., approximately 25 or 33 or 50 or 66 percent smaller) relative to the typical maximum depth of roots (Droot) of the particular crop to be irrigated. In some demonstrative embodiments, the value of insertion depth D may be approximately 25 to 40 percent, or approximately 40 to 60 percent, of the maximum depth of roots Droot. It is noted that the value of Droot may be, for example, the actual or known value of the maximum depth of the root, or an estimated value (e.g., based on agricultural tables or databases which indicate a typical maximum root depth for various types of crops or plants).

Memory unit 117 may comprise, for example, a Flash memory unit, or other suitable short-term or long-term memory unit able to store data. Memory unit 117 may store parameters table 118, storing parameters used in the operation of irrigation device 110, or storing a log of parameters or measurements or calculated values.

At a first time-point T1, valve controller 112 may cause valve 111 to open and allow water to flow from water source 105 and out of water outlet 121. At the first time-point T1, irrigation processor 116 may receive a signal from valve controller 112, may read the current value of real time clock 115, and may store or record that value as the first time-point T1 in parameters table 118.

Following the opening of valve 111, water may flow downward from water outlet 121, and may gradually drain downward. At a second, subsequent, time-point T2, the draining water may reach moisture sensor 113, which may sense moisture. Moisture sensor 113 may send a signal to irrigation processor 116, indicating that moisture sensor 113 sensed moisture. Irrigation processor 116 may read the current value of real time clock 115, and may store or record that value as the second time-point T2 in parameters table 118.

Irrigation processor 116 may calculate the time difference between the first time-point T1 and the second time-point T2, thereby producing a value dT indicating the time period that it took the water to drain the pre-defined depth D.

Irrigation processor 116 may comprise one or more modules able to further process the data that was collected and/or previously-stored in parameters table 118. For example, irrigation processor 116 may comprise a water drainage speed calculator 119, and a target drainage time calculator 125.

Water drainage speed calculator 119 may divide the pre-defined depth D by the time period dT, thereby determining a value of water drainage speed V, which may be stored in parameters table 118.

Target drainage time calculator 125 may multiply the value of water drainage speed V, by the maximum depth Droot of the roots of the particular crops being irrigated, thereby producing a value indicating the total time required (Ttotal), measured from the first time-point T1, until the draining water reaches the maximum depth Droot. Alternatively, target drainage time calculator 125 may determine the depth difference between Droot and D, to determine the remaining depth Dremain for drainage; and may multiply that depth difference Dremain by the water drainage speed V, thereby producing a time value (Tremain) indicating the remaining time until the draining water reaches the maximum depth Droot.

Irrigation processor 116 may utilize real time clock 115 to monitor passing time, and to determine that the remaining time period Tremain elapses. Once the time period Tremain elapses, irrigation processor 116 may send a signal to valve controller 112, and valve controller 112 may cause valve 111 to shut, thereby stopping further irrigation of water.

Optionally, irrigation processor 116 may communicate with one or more remote units, for example, via transceiver 118 which may include a wireless transmitter or a wired transceiver. For example, irrigation processor 116 may communicate with server 131, and may transmit to server 131 the collected data and/or the calculated data. Server 131 may store the data in database 132, and may serve generate reports and/or statistics which may be served to a user (e.g., administrator, crop owner, agronomist) utilizing computing device(s) 133 (e.g., a desktop computer, a laptop computer, a tablet, a smartphone). Optionally, server 131 may generate and present data in a format which may be accessible to users of computer device(s) 133 over the Internet and/or via a Web browser.

Optionally, memory unit 117 and/or database 132 may store moisture level values, which may be sensed by moisture sensor 113, for example, substantially continuously or at pre-defined time intervals (e.g., every five seconds, every ten seconds, every thirty seconds). The moisture data may be taken into account by irrigation processor 116 in order to determine that additional irrigation is required and to initiate opening of valve 111 through valve controller 112.

Server 131 and processor 116 may be capable of two-way communication, such that, for example, irrigation processor 116 may report data to server 131, and server 131 may optionally provide data and/or commands to irrigation processor 116. For example, server 131 may be utilized by a user, either directly or through computing device 133, in order to set or modify the value of maximum root depth Droot, or in order to provide commands that manually override the decisions made by irrigation processor 116 (for example, the crop owner may decide to stop irrigation, based on weather prediction of rainfall), or in order to allow other modifications of irrigation intensity (e.g., in order to increase or decrease growth-time of plants or fruit or flowers; in order to control fruit size; in order to make fruit more oily or more diluted).

Optionally, irrigation processor 116 may utilize the following equation for calculating the speed Virr of irrigation water spreading or draining within the soil:

$$Virr = Xctd/Tx \quad (1)$$

where Xctd may indicate the depth of the sensitive part of moisture sensor 113 (e.g., sensing tip 144) in the soil; and Tx may indicate the time during which the water drained and arrived at the sensitive part of moisture sensor 113.

Accordingly, the time Tclose that should remain until closing of water source 105 may be calculated by irrigation processor 116 by using the following equation:

$$Tclose = (Sdepth - Xctd)/Virr \quad (2)$$

where Sdepth is the depth of the desired irrigation (e.g., may be equivalent or similar to the maximum depth of the root of the plant).

In a demonstrative example, the maximum root depth may be 45 centimeters; and moisture sensor 113 may be placed in ground such that sensitive tip 144 may be placed at a depth of 15 centimeters. Irrigation may commence, and after three minutes, moisture sensor 113 may sense the draining water. Accordingly, irrigation processor 116 may divide 15 centimeters by 3 minutes, to determine that the drainage speed of water is 5 centimeters per minute. Since the maximum root depth, in this demonstrative example, is 45 centimeters, the total irrigation time may be calculated to be 9 minutes (by dividing the depth of 45 centimeters, by the drainage speed of 5 centimeters per minute). Since three minutes elapsed already, six minutes remain until closure of water source 105. In an alternate calculation, 30 centimeter of depth remain for drainage, at a water drainage speed of 5 centimeters per minute, again yielding the result of 6 minutes remaining for irrigation.

The present invention may be utilized in order to irrigate a single plant, or a batch or set of plants or crops, or a field or multiple fields of plants or crops. Optionally, multiple irrigation devices 110 may be operable connected to a single water source 105 and/or to a single server 131.

The present invention may utilize only a single humidity sensor (e.g., moisture sensor 113) per crop, in contrast with conventional irrigation systems which may require two or three separate humidity sensors per crop (e.g., a first humidity sensor located at ground level, and one or more humidity sensor located underground, with at least one sensor located at or near the maximum root depth).

The present invention may eliminate the need to place a humidity sensor at or near the maximum root depth of the crop, in order to determine that moisture reaches the maximum root depth. Furthermore, the present invention may avoid excessive irrigation or wasteful irrigation, since a humidity sensor that is operable at the maximum root depth may sense water as soon as they reach it, such that the water that are still draining above it are wasteful and were not needed to irrigate the root. The present invention thus avoids a situation in which a root-level humidity sensor senses moisture and instructs to stop the irrigation, which is typically too late on the timeline and already reflects wasting of water.

The present invention need not utilize a humidity sensor located at the maximum root depth, and therefore, the present invention need not replace or relocate such humidity sensor once the roots of the crops grow or deepen further into the ground.

The present invention may allow crop-owners to determine and modify a precise irrigation depth in agriculture, to calculate an exact or optimal volume of water required for irrigating a particular plant or crop or tree, and to allow closing or shutting of a water source or water stream before it reaches the entire depth or length of the root. This may be achieved by calculating the speed of water spreading or draining in the soil, and closing the water source at a time-point such that already-irrigated water continues spreading or draining towards the depth required for the plant growing, and along the length of its root only, without unnecessary waste. In addition to water saving, this may allow utilization of a single humidity sensor per plant, and may avoid sensor replacement or sensor relocation during various stages of the plant growth life, and reduces or eliminates the need to consult with or to employ agriculture experts.

Some portions of the discussion herein may relate, for demonstrative purposes, to irrigation of crops of trees or other plants which may be planted in the ground, or may be located at ground level. However, the present invention may further be utilized in conjunction with crops, trees and/or plants which may be located off-ground, on a floor, in a planter, in a greenhouse, in a growing device or a growing container which may be disconnected from the ground or may be unattached to the ground, in a container which may be movable or portable, in single-level or multiple-level platform(s) or soil containers or other containers (e.g., in a greenhouse), or the like. The term "ground surface" or "ground level" as used herein may thus optionally refer to a top surface or a top level of such planter, level, platform, shelf, soil container, or the like. Similarly, reference herein to a "ground" or to "soil" may optionally include other suitable types of material(s) in which plants or crops may be grown.

Applicants have conducted experiments demonstrating the generally-linear progress of irrigation drainage depth, as a function of the time that elapses since irrigation begins. The results of some demonstrative experiments are shown in FIGS. 2A-2B.

Figure 2A:
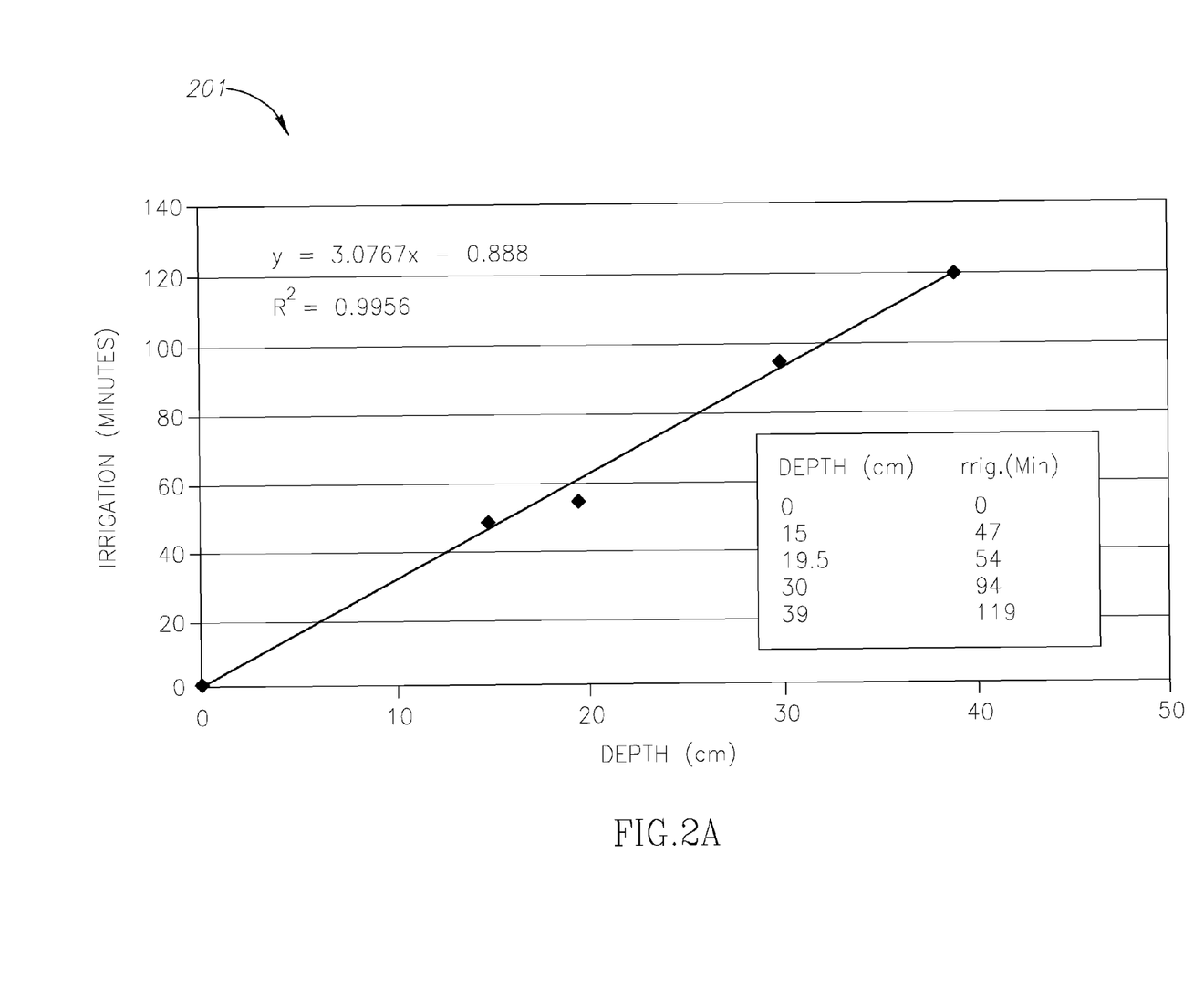
FIGS. 2A-2B are schematic graphs demonstrating a linear relation between irrigation time and irrigation drainage depth, in accordance with demonstrative examples of the present invention.

Reference is made to FIG. 2A, which is a schematic graph 201 demonstrating a linear relation between irrigation time (the vertical axis, in minutes) and irrigation drainage depth (the horizontal axis, in centimeters), in accordance with a demonstrative example of the present invention. Measurements were performed on a peat-tuff substrate, with soil water tension of 10 cbar.

Figure 2B:
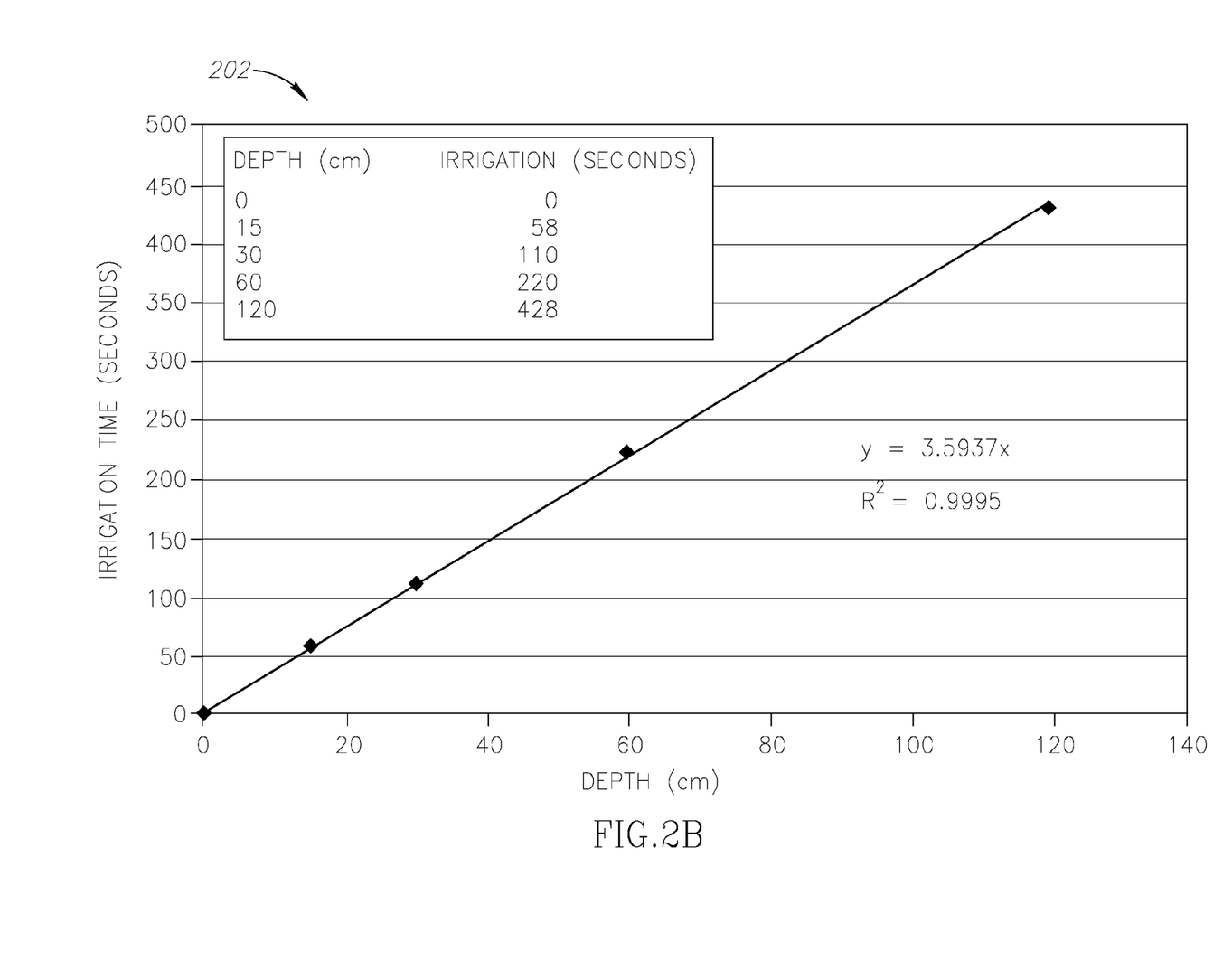

Reference is further made to FIG. 2B, which is a schematic graph 202 demonstrating a linear relation between irrigation time (the vertical axis, in seconds) and irrigation drainage depth (the horizontal axis, in centimeters), in accordance with another demonstrative example of the present invention. Measurements were performed in a water-air environment without substrate; water tension of 10 cbar; clay inserted into water upon commencement of irrigation, causing rapid decrease water tension within seconds. A coefficient R was used to normalize the data.

Figure 3:
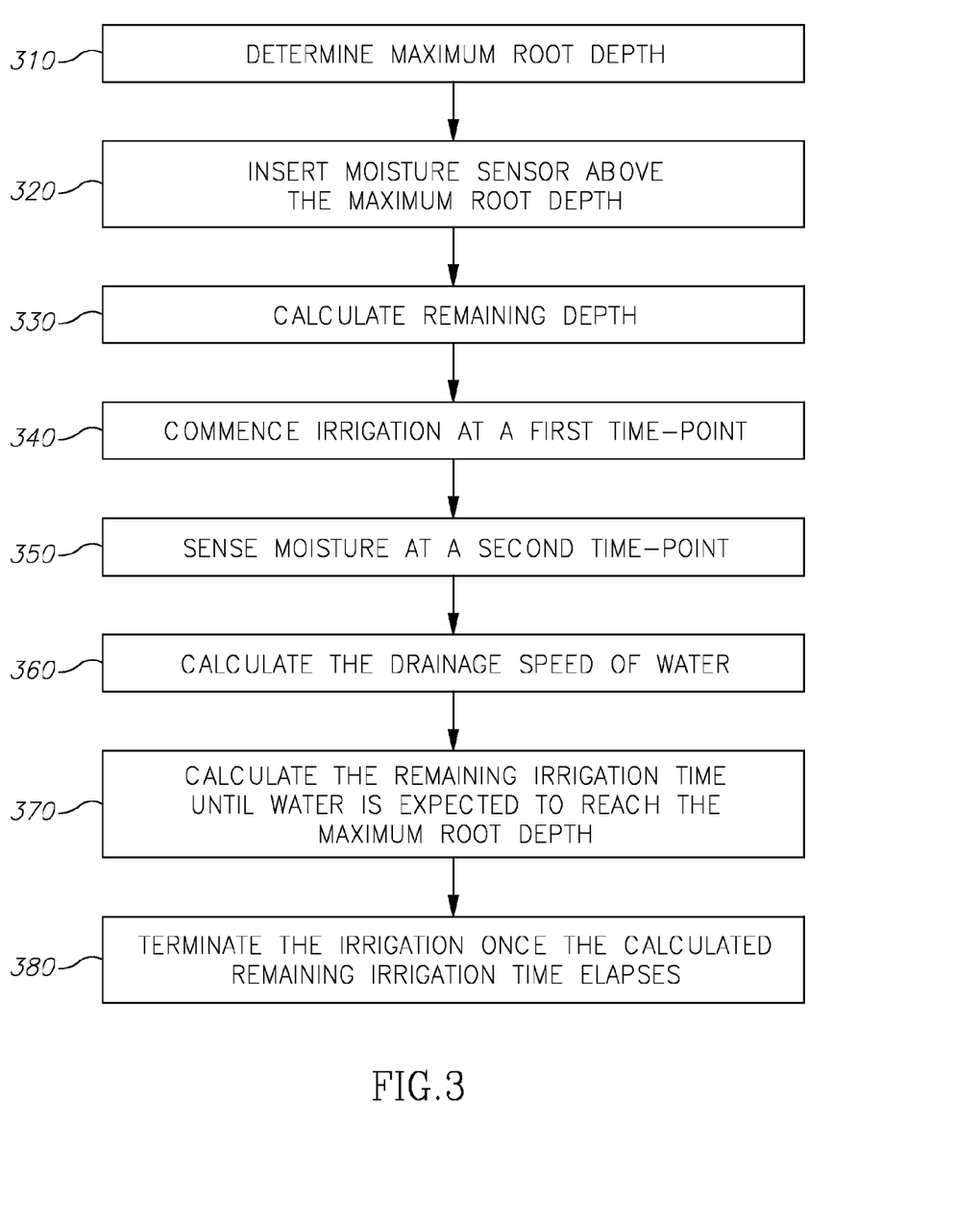
FIG. 3 is a flow-chart of a method of irrigation, in accordance with the present invention.

Reference is made to FIG. 3, which is a flow-chart of a method of irrigation, in accordance with the present invention. The method may be used, for example, in conjunction with irrigation system 100 of FIGS. 1A-1B, or other suitable systems or devices.

The method may comprise, for example, determining a maximum root depth of a plant (block 310).

The method may comprise, for example, inserting a moisture sensor into the ground, such that a sensitive tip of the moisture sensor may be located in between the ground surface and the maximum root depth (block 320), for example, at depth equivalent to Xctd mentioned in the above equations.

The method may comprise, for example, calculating a remaining depth, as the depth difference between the maximum root depth and the moisture sensor depth (block 330).

The method may comprise, for example, commencing water irrigation at a first time-point (block 340).

The method may comprise, for example, sensing at a second time-point that irrigation water reached the moisture sensor (block 350).

The method may comprise, for example, calculating the drainage speed of water based on the first time-point, the second time-point, and the depth of the moisture sensor (block 360).

The method may comprise, for example, calculating the remaining irrigation time until irrigation water is expected to reach the maximum root depth, based on the calculated drainage speed of water and the remaining depth (block 370).

The method may comprise, for example, terminating the irrigation (e.g., closing the water source or shutting the water valve) once the calculated remaining irrigation time elapses (block 380).

Other suitable operations may be used in accordance with the present invention.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments of the present invention may take the form of an entirely hardware embodiment, an entirely software embodiment, or an embodiment including both hardware and software elements. Some embodiments of the present invention may be implemented in software, firmware, resident software, microcode, an application which may be downloaded and/or installed by a user, an application which may run in a browser, a client-side application, a server-side application, a client-server application, or the like. Some embodiments of the present invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system or device. Some embodiments of the present invention may be implemented, for example, using a machine-readable medium or article which may store an instruction or a set of instructions that, if executed by a machine, cause the machine (e.g., a computer or an electronic device) to perform a method and/or operations described herein.

Some embodiments of the present invention may include or may utilize, for example, a processor, a central processing unit (CPU), a digital signal processor (DSP), a controller, an integrated circuit (IC), a memory unit, a storage unit, input units, output units, wired and/or wireless communication units, an operating system, and other suitable hardware components and/or software modules.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. An irrigation system for irrigating a plant having a root, the irrigation system comprising:
    a valve to begin irrigation from a water source at a first time-point;
    a single moisture sensor to sense moisture at a second, subsequent, time-point, said moisture sensor being located underground at an insertion depth between ground surface and a maximum depth;
    a water drainage speed calculator to calculate a water drainage speed based on the first time-point, the second time-point, and the insertion depth of the moisture sensor; and
    a target drainage time calculator to calculate a remaining time for irrigation, based on the calculated water drainage speed and further based on a difference between the insertion depth and the maximum depth.

2. The irrigation system of claim 1, further comprising:
    an irrigation processor to determine that the remaining time for irrigation elapsed, and to send a signal commanding the valve to stop irrigation from said water source.

3. The irrigation system of claim 2, further comprising:
    a wireless transmitter to transmit to a remote server data corresponding to at least one of: the first time-point, the second time-point, the calculated water drainage speed, and the calculated remaining time for irrigation.

4. The irrigation system of claim 1, further comprising:
    a memory unit to store, in proximity to the plant, a parameter indicating the maximum depth.

5. The irrigation system of claim 4, further comprising:
    a remote server comprising a wireless transmitter to enable a user to remotely modify a value of said parameter stored in said memory unit proximal to the plant.

6. The irrigation system of claim 1, wherein the insertion depth is approximately 25 to 40 percent of the maximum root depth.

7. The irrigation system of claim 1, wherein the insertion depth is approximately 40 to 60 percent of the maximum root depth.

8. The irrigation system of claim 1, wherein the insertion depth of the moisture sensor is unchanged as the root of the plant grows.

9. A method for irrigating a plant having a root, the method comprising:
    beginning irrigation from a water source at a first time-point;
    sensing moisture at a second, subsequent, time-point, by a single moisture sensor being located underground at an insertion depth between ground surface and a maximum depth of the root;
    calculating a water drainage speed based on the first time-point, the second time-point, and the insertion depth of the moisture sensor; and
    calculating a remaining time for irrigation, based on the calculated water drainage speed and further based on a difference between the insertion depth and the maximum depth of the root.

10. The method of claim 9, further comprising:
    determining that the remaining time for irrigation elapsed; and
    sending a signal commanding the valve to stop irrigation from said water source.

11. The method of claim 10, further comprising:
    wirelessly transmitting to a remote server data corresponding to at least one of: the first time-point, the second time-point, the calculated water drainage speed, and the calculated remaining time for irrigation.

12. The method of claim 9, further comprising:
    storing in proximity to the plant, a parameter indicating the maximum depth.

13. The method of claim 12, further comprising: remotely modifying a value of said parameter stored in said memory unit proximal to the plant.

14. The method of claim 9, wherein the insertion depth is approximately 25 to 40 percent of the maximum root depth.

15. The method of claim 9, wherein the insertion depth is approximately 40 to 60 percent of the maximum root depth.

16. The method of claim 9, wherein the insertion depth of the moisture sensor is unchanged as the root of the plant grows.

* * * * *